(No Model.) 8 Sheets—Sheet 1.

F. H. TREAT.
TRANSFER TABLE FOR ROLLING MILLS.

No. 516,460. Patented Mar. 13, 1894.

Witnesses:
Chas. E. Gaylord,
E. J. Timmerman.

Inventor,
Francis H. Treat,
By Banning & Banning & Payson,
Att'ys (No Model.) 8 Sheets—Sheet 2

F. H. TREAT.
TRANSFER TABLE FOR ROLLING MILLS.

No. 516,460. Patented Mar. 13, 1894.

Witnesses:
Chas. E. Gaylord,
C. J. Zimmerman.

Inventor:
Francis H. Treat,
By Banning & Banning & Payson
Attys.

(No Model.) 8 Sheets—Sheet 4.

F. H. TREAT.
TRANSFER TABLE FOR ROLLING MILLS.

No. 516,460. Patented Mar. 13, 1894.

Witnesses:
Chas. E. Gaylord,
C. J. Zimmerman.

Inventor.
Francis H. Treat,
By Banning & Banning & Payson,
Att'ys.

(No Model.)
8 Sheets—Sheet 5.
F. H. TREAT.
TRANSFER TABLE FOR ROLLING MILLS.
No. 516,460.  Patented Mar. 13, 1894.
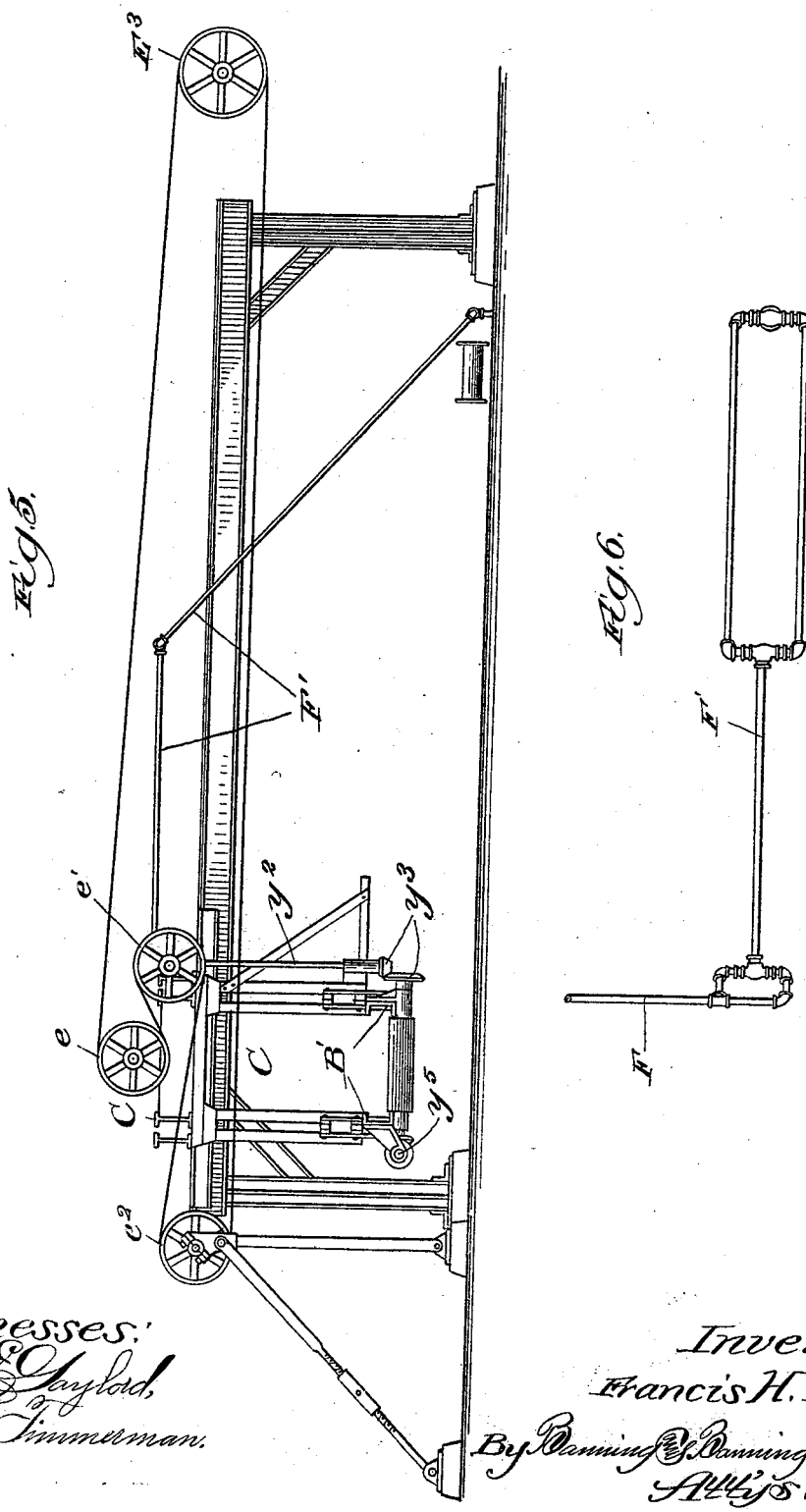
Witnesses:
Chas. E. Gaylord,
C. J. Timmerman.
Inventor:
Francis H. Treat.
By Banning & Banning & Payson
Attys (No Model.) 8 Sheets—Sheet 6.
F. H. TREAT.
TRANSFER TABLE FOR ROLLING MILLS.
No. 516,460. Patented Mar. 13, 1894.
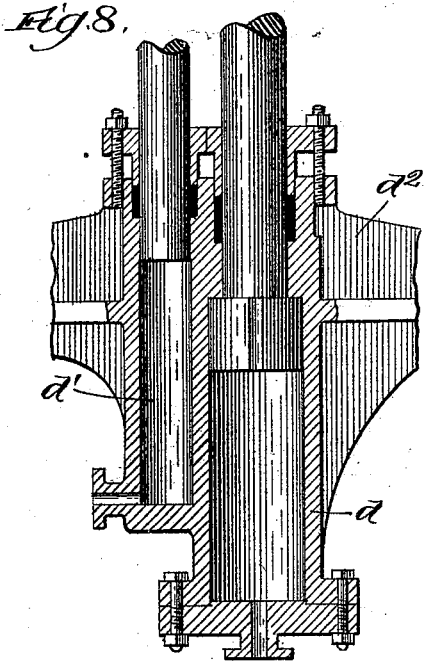
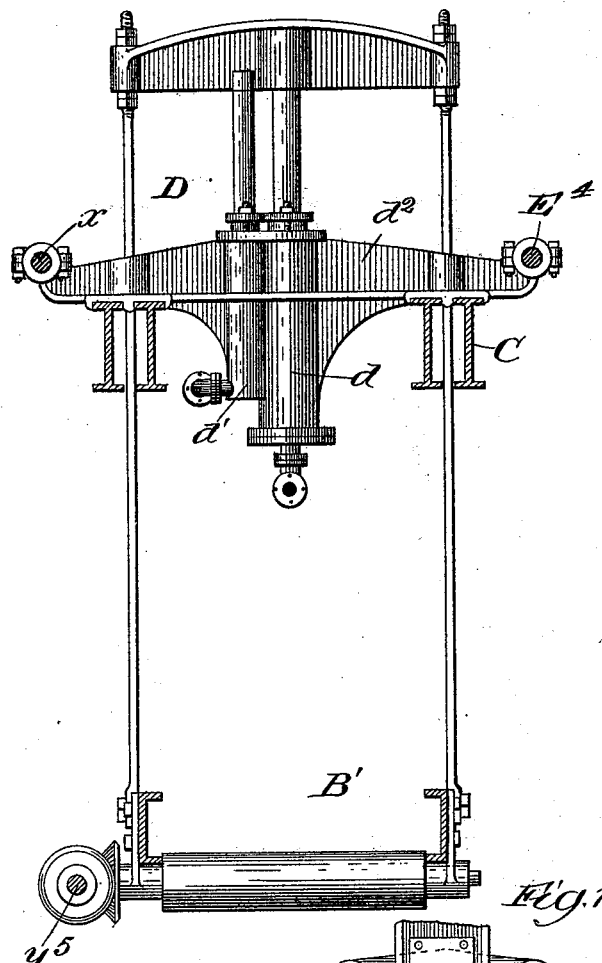
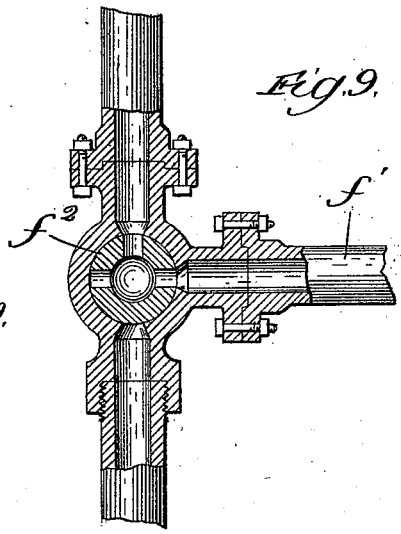
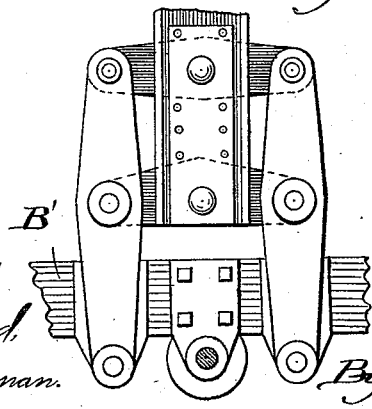
Witnesses:
Chas. E. Gaylord,
C. J. Timmerman.
Inventor:
Francis H. Treat.
By Banning & Banning & Payson
Att'ys (No Model.) 8 Sheets—Sheet 7.
F. H. TREAT.
TRANSFER TABLE FOR ROLLING MILLS.
No. 516,460. Patented Mar. 13, 1894.

Witnesses:
Inventor:
Francis H. Treat, (No Model.)  8 Sheets—Sheet 8.

F. H. TREAT.
TRANSFER TABLE FOR ROLLING MILLS.

No. 516,460.  Patented Mar. 13, 1894.

Witnesses:
Chas. E. Gaylord,
E. J. Timmerman.

Inventor:
Francis H. Treat,
By Banning & Banning & Payson,
Atty's.

THE NATIONAL LITHOGRAPHING COMPANY,
WASHINGTON, D. C.

UNITED STATES PATENT OFFICE.

FRANCIS H. TREAT, OF CHICAGO, ILLINOIS.

TRANSFER-TABLE FOR ROLLING-MILLS.

SPECIFICATION forming part of Letters Patent No. 516,460, dated March 13, 1894.

Application filed June 20, 1893. Serial No. 478,230. (No model.)

*To all whom it may concern:*

Be it known that I, FRANCIS H. TREAT, of Chicago, Illinois, have invented a new and useful Improvement in Transfer-Tables for Rolling-Mills, of which the following is a specification.

The object of my invention is to provide for handling ingots or blooms while in the process of rolling, and for raising, lowering, transferring and feeding them into the different passes or sets of rolls, particularly in a three high train; and the invention consists in the features and combinations hereinafter described and claimed.

Figure 1:
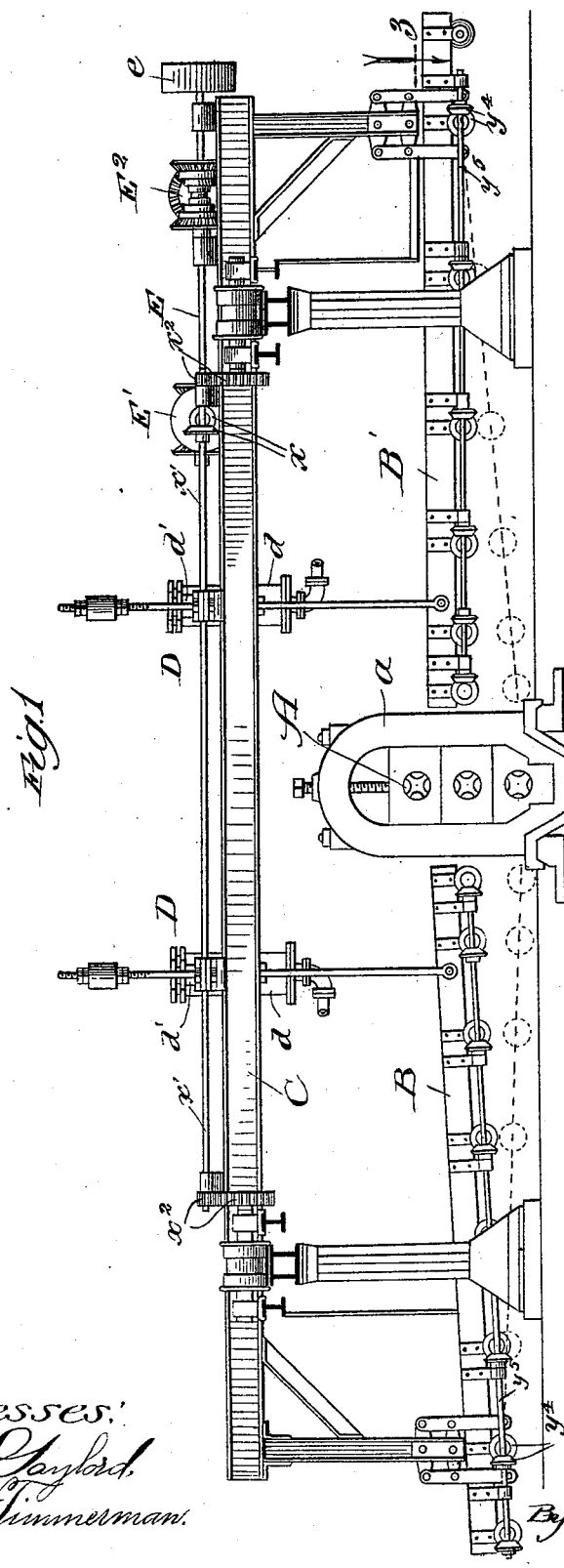
Figure 2:
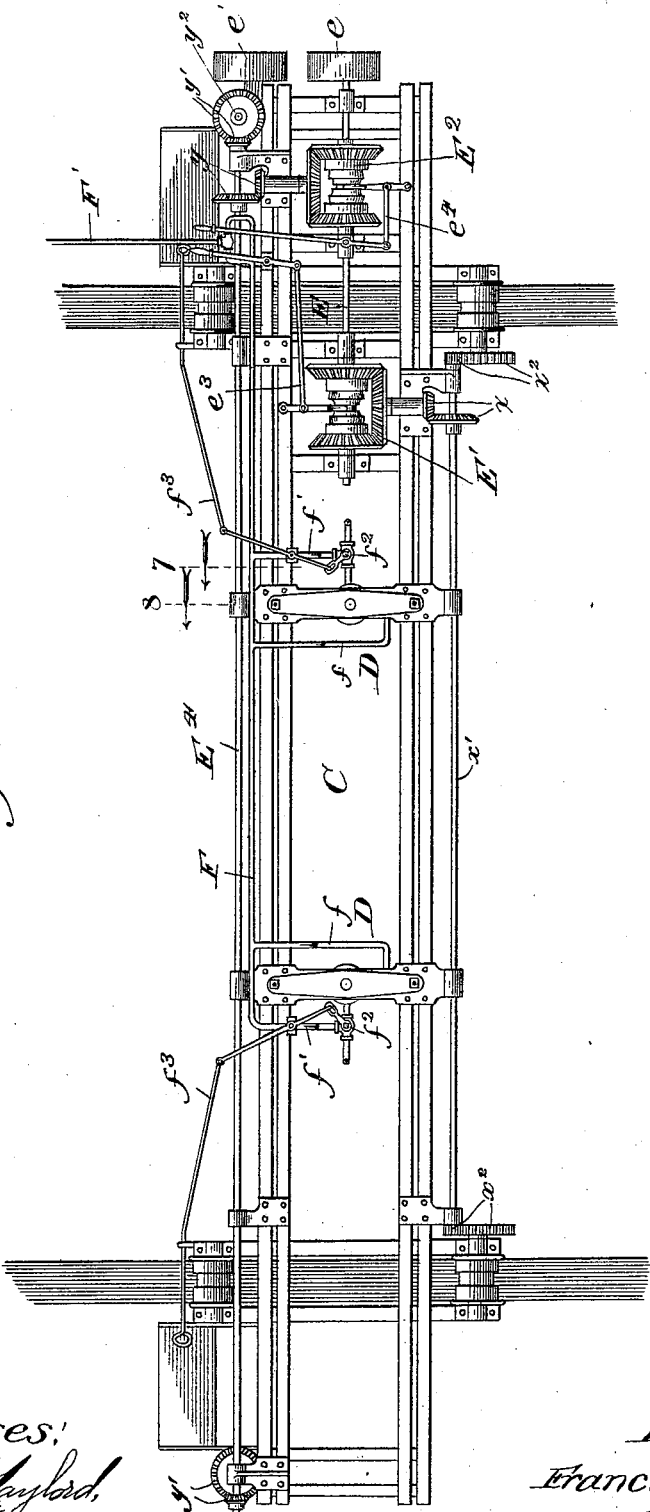
Figure 3:
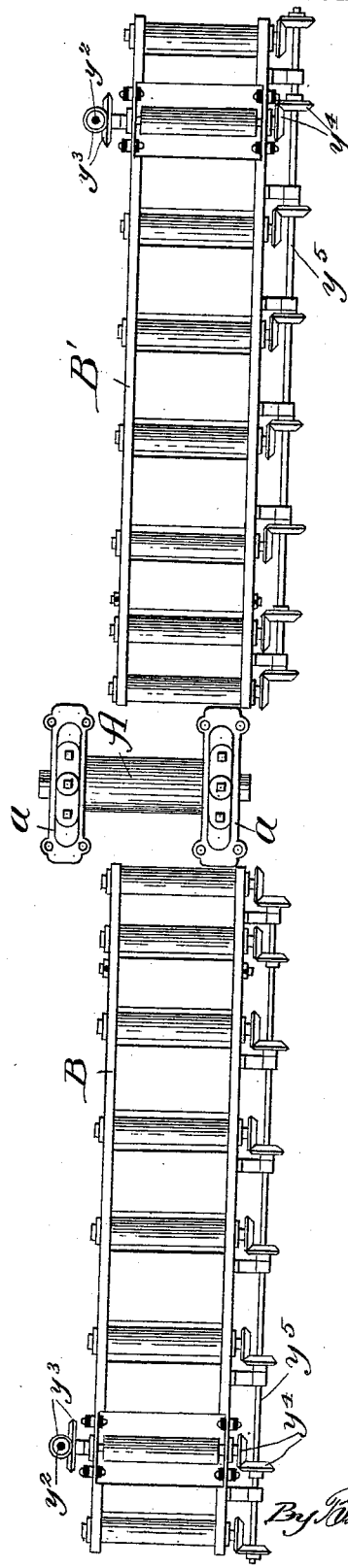
Figure 4:
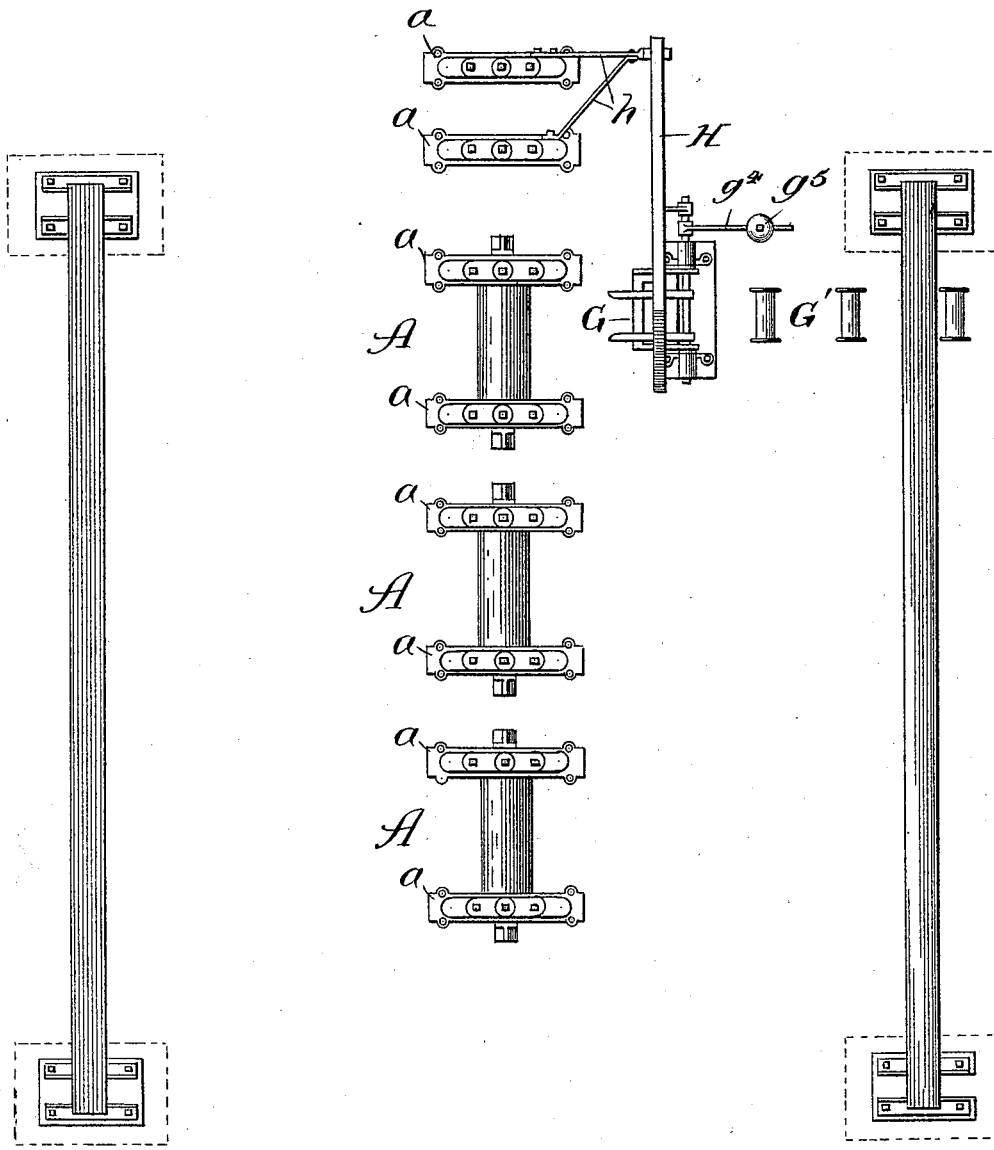
Figure 11:
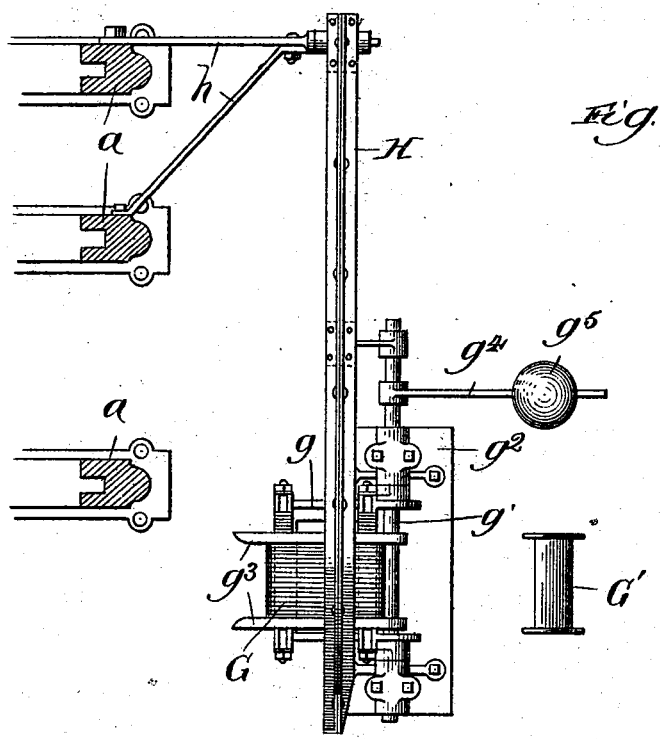
Figure 12:
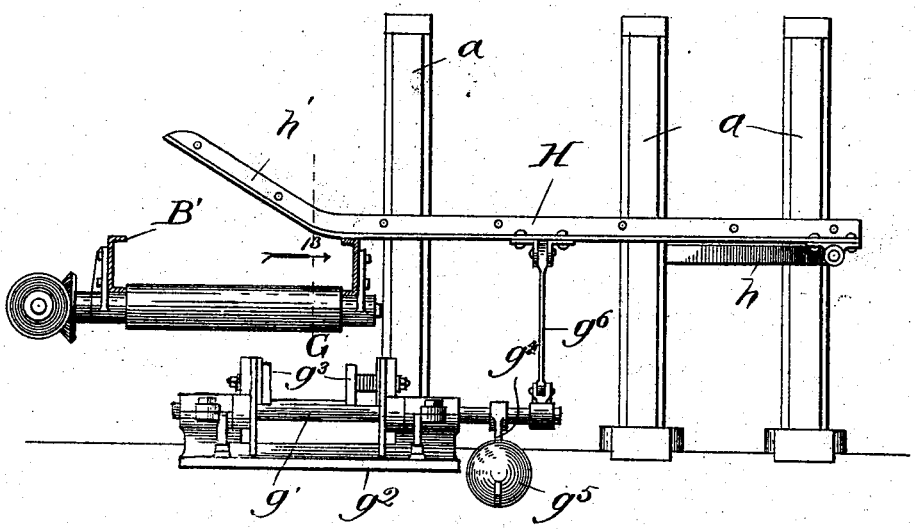

In the accompanying drawings, Figure 1 is a side elevation of my improved transfer table; Fig. 2 a plan view of the same; Fig. 3 a horizontal sectional view, taken in line 3 of Fig. 1; Fig. 4 a diagrammatic plan view of a train of rolls, elevated track, guide and runout; Fig. 5 an end elevation of a transfer table, elevated track and driving mechanism; Fig. 6 a detail view of a jointed arm or walking pipe forming part of the driving mechanism; Fig. 7 a transverse sectional view, taken on line 7 of Fig. 2; Fig. 8 an enlarged sectional view, taken on line 8 of Fig. 2; Fig. 9 an enlarged horizontal sectional view of the valve mechanism used to regulate the raising and lowering of the table; Fig. 10 an enlarged detail view showing the connections of the table and frame proper; Fig. 11 an enlarged plan view of a guide or straightener in line of a finishing pass; Fig. 12 an elevation of the guide and straightener shown in Fig. 11, the table being shown in an elevated position; and Figs. 13 and 14 still further enlarged sectional views taken in line 13 of Fig. 12, showing the parts in different positions.

My improved transfer table consists essentially of a car mounted and adapted to travel on elevated tracks; two tables proper suspended therefrom, one in front and one in rear of the train of rolls, the tables being so suspended that the ends adjacent to the rolls can be raised or lowered; hydraulic mechanism for raising and lowering the tables; and driving mechanism for propelling the car and operating the rolls of the tables. In addition to these parts, I also prefer to use a special form of guide and straightener between the ordinary runout and train of rolls, as hereinafter described.

The traveling car, C, may be made of any convenient construction; but of course it should be mounted on elevated tracks in position to enable the tables proper to be raised and lowered, or moved from one position to another, as desired. In this respect, it operates as a traveling crane.

The transfer tables proper, B B', which are suspended from the elevated car, may be of any convenient form desired. As shown, they are in the ordinary form, except that instead of being supported from the bottom, their ends, adjacent to the rolls, A, are suspended by rods extending downwardly from the cross heads of the hydraulic mechanism, and their outer ends are suitably pivoted to hangers secured to the ends of the car. The tables are so constructed that their inner ends—that is, the ends adjacent to the train of rolls—may be raised or lowered to feed to or receive from the different passes of the rolls—this raising or lowering being with reference to the car. This raising and lowering of the inner ends of the tables is permitted by the pivotal connections of their outer ends. The tables are capable of being raised or lowered separately or together as desired; and although I have shown two tables, it will of course be understood that I contemplate using only one wherever only one is needed. I also contemplate raising or lowering one end of the table or its entire body as desired.

The hydraulic mechanism, D, for each table consists of two hydraulic cylinders, $d, d'$, preferably of different sizes and forming part of a cross arm, $d^2$, supported upon the car and fastened thereto. In the form shown, the smaller cylinder is adapted to be under continual uniform pressure, while the larger cylinder is adapted to have an intermittent pressure. The pressure of the smaller cylinder being insufficient to support the weight of the table, the inner end of the table is lowered whenever the pressure of the larger cylinder is lessened or removed; and the operation is reversed whenever it is desired to raise the table. In this way, the inner ends of the table are practically raised or lowered by means of the larger cylinder, while the pressure in the smaller cylinder operates more or less as a counter-balance against the weight of the table.

The car is propelled and the feed rolls in the table operated by means of driving mechanism, preferably mounted at one end of the car. This driving mechanism consists of two clutches, E′, E², provided with miter gears, and forming what is commonly called a reversing clutch. The clutch E′ operates to transmit motion to the wheels or rollers of the car, through intermediate mechanism consisting of beveled gears $x$, shaft $x'$, and spur wheel and pinions $x^2$, the spur wheel being secured to the shaft on which the rollers of one side of the car are mounted. The clutch E² operates to transmit motion to the feed rollers of the table, through intermediate mechanism consisting of beveled gears $y$, line shaft E⁴ running lengthwise of the car, and beveled gears $y'$ connecting each end of the line shaft with vertical shafts $y^2$, which vertical shafts are in turn connected, through beveled gears $y^3$, with rollers of the table. Each roller connected with the vertical shafts is connected with all the other rollers by miter gearing $y^4$, and a line shaft $y^5$ running lengthwise of the table.

The driving pulley, E³, for moving the car and operating the feed rollers, is preferably adjacent to one end of the elevated track and connected to the car by a compensating pulley and belt mechanism. The shaft, E, carrying the clutches, is provided at the outer end with a pulley $e$ adapted to be driven by a belt, and adjacent thereto, on the end of the car, is another pulley, $e'$, which may be termed an idler. A second idler, $e^2$, is secured at or near the end of the elevated track opposite the driving pulley. This pulley is adjustable and acts as a tightener of the belt, which passes around the various pulleys for transmitting power. (See Fig. 5.) The belt mechanism and driving shaft being constantly in motion, this arrangement of pulleys operates, through the clutches, to move the car and rollers in either direction or to stop them at any point desired. It also enables the car to travel from one end of the track to the other without interfering with the uniform tension of the belt. The pulley and belt mechanism and clutch mechanism being mounted on the car, the motions of the table may be controlled by the operator on the car.

The power applied to the hydraulic cylinders is conveyed thereto through a main pipe, F, running longitudinally along one side of the car, with branch pipes, $f, f'$ leading to the various cylinders. To permit the car to travel from one position to another on its track, I provide at one end of the main pipe a jointed arm or walking pipe, F′, which is connected to any suitable source of pressure—the jointed arm being adapted to fold as the car advances. The arm thus folding is made to extend to a greater or less distance as the car recedes or advances on its track. The branch pipes, $f'$, leading to the larger cylinders in the hydraulic mechanism, are provided with suitable valves, $f^2$, for controlling the pressure in said cylinders. These valves are provided with suitable operating levers, $f^3$, as shown diagrammatically in Fig. 2 of the drawings. The clutches of the driving mechanism are also provided with operating levers, $e^3, e^4$, which are likewise shown diagrammatically in Fig. 2. It will be understood, however, that these various levers may be constructed in other ways or placed in other positions as desired.

Figure 13:
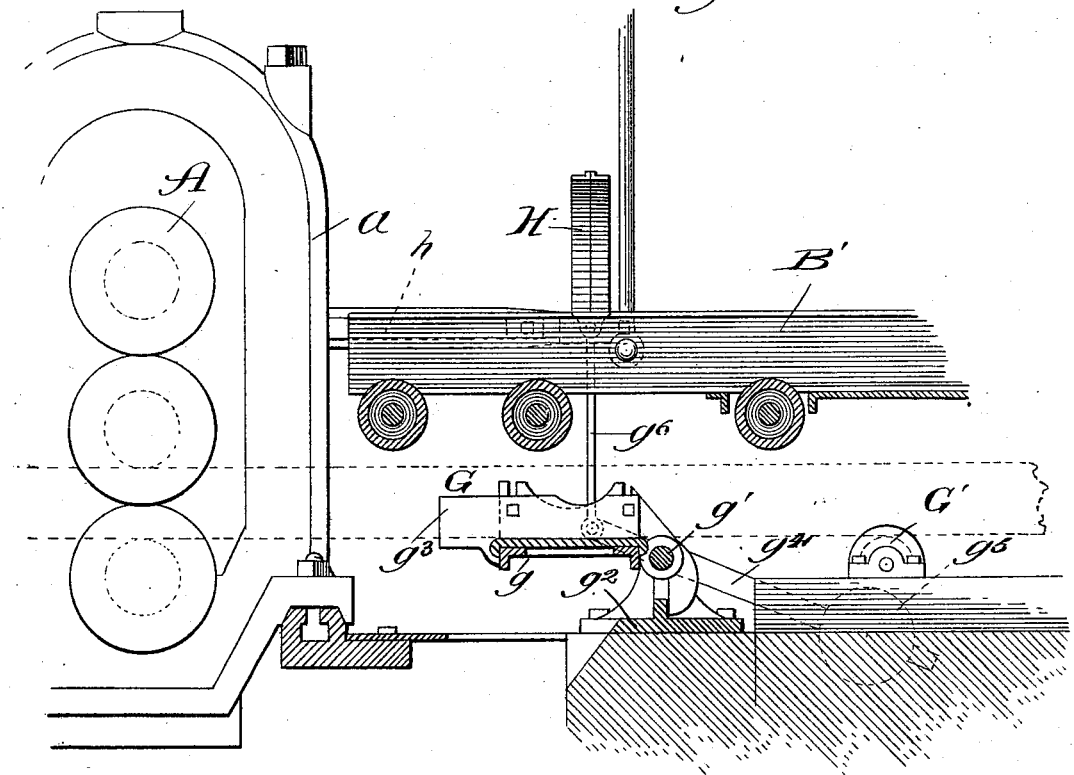
Figure 14:
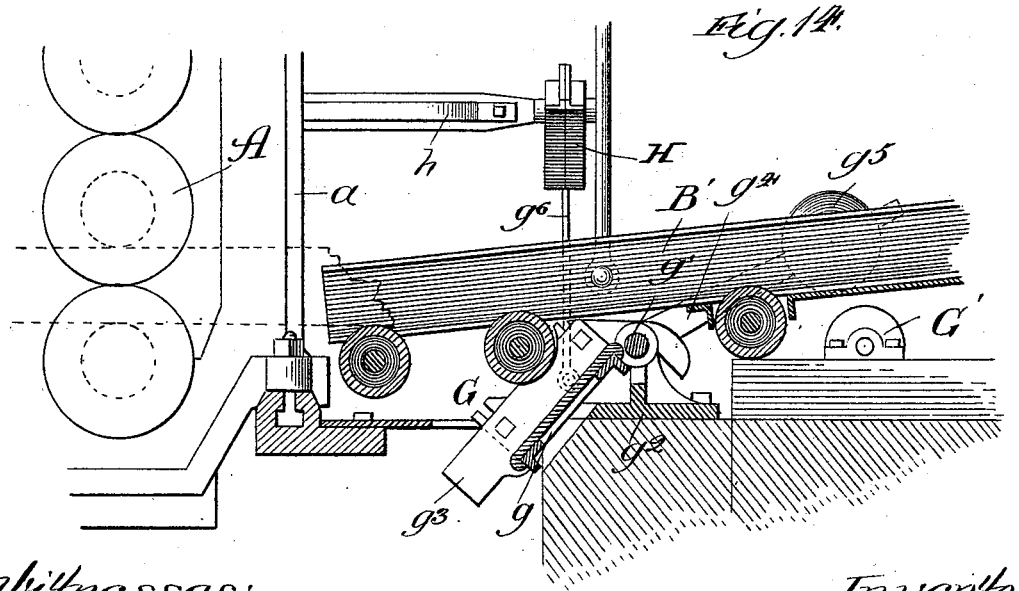

I prefer to use a special form of guide and straightener, G, between the train of rolls and ordinary run-out—this guide and straightener being capable of use in other constructions as well as with the elevated car or forms of table shown. As shown in Figs. 4 and 11 to 14, inclusive, this guide or straightener, when in its normal position, is so constructed as to receive and straighten the material after it leaves the rolls, and guide the same in its onward course to the ordinary run-out G′. The guide or straightener consists of a suitable frame, $g$, mounted upon a shaft, $g'$, which in turn is supported in proper bearings upon a bed, $g^2$. This frame is provided with cheek plates, $g^3$, capable of being adjusted to adapt it to different widths of material treated. Near one end of the shaft I mount an arm, $g^4$, provided with a counter weight, $g^5$, which partly balances the weight of the frame, and thus aids in holding it in its operative position, as shown in Fig. 13. Another arm, $g^6$, is also connected to the shaft which arm in turn is connected to a lever, H, somewhat higher and extending at right angles thereto, the lever itself being pivoted at one end to an arm, $h$, extending out from one of the housings, $a$, so that in operation it effects the raising of the guide to its operative position. The lever is so placed that the table coming into position opposite the finishing pass moves under and raises its outer end, so as to make the guide operative when the table is in its highest position. When the table is lowered, the guide descends of itself, so as to be out of the way. As shown, the lever is of such form, its inner end, $h'$, being bent upward, as to be operative through the movements of the table in any position.

In operation the elevated car is caused to move back and forth on its tracks, and thus move the tables laterally as required for transferring the piece to bring it in line with different passes of the rolls; and when it is desired to raise and lower the piece so as to bring it in line with different passes vertically, this is accomplished by elevating the inner ends of the tables by means of the hydraulic mechanism above described. In this way, I am enabled to handle the piece by machinery, and without the use of surface tracks to occupy space or interfere with the changing or adjusting of rolls or guides or other operations. Both the tables being mounted on one car, and having their feed rollers operated by the same mechanism, they may be caused to move and work in unison as desired; and the construction is such as to permit the piece to be discharged from the finishing passes under the rear table, the same being then elevated, and thus cause the two tables to become freed therefrom and ready for another operation together, or substantially at the same time.

It will of course be understood that I do not intend to limit myself to minor features or details of construction, or to the use of all my improvements together, or in a single machine—the same being capable of use separately or together as desired. On the contrary, I intend to vary form and construction, and to omit members or use equivalents, as circumstances may suggest or render expedient.

I am aware that it is old to suspend a transfer table from an elevated car, and also to use hydraulic mechanism for raising and lowering a transfer table mounted on a car running on a ground or surface track; but my invention differs from all former constructions with which I am acquainted, in that its transfer table is suspended from an elevated car and capable of being raised and lowered with reference thereto while in operation, special mechanism being provided for this purpose. In these respects it differs materially from constructions in which the table is merely capable of vertical adjustment, but not of being moved vertically while in operation.

I claim—

1. In a rolling mill, the combination of an elevated car, a transfer table, and hydraulic mechanism securing the car and inner end of the table together, whereby the table may be moved laterally and its inner end raised or lowered, substantially as described.

2. In a rolling mill, the combination of an elevated car, a transfer table, and hydraulic mechanism securing the car and inner end of the table together, the outer end of the table being pivotally secured to hangers extending downwardly from the car, substantially as described.

3. In a rolling mill, the combination of an elevated car, two transfer tables, and hydraulic mechanism securing the car and inner ends of the tables together, the outer ends of the tables being secured to hangers extending downwardly from the car, whereby both tables may be moved and operated at the same time, substantially as described.

4. In a rolling mill, the combination of an elevated car, a transfer table suspended from the car, pulley and belt mechanism for propelling the car and driving the rollers of the table, and clutch mechanism for starting and stopping the car and rollers and reversing the direction thereof, the pulley and belt mechanism and clutch mechanism being mounted on the car, whereby the motions of the table may be controlled from the car, substantially as described.

5. In a rolling mill, the combination of an elevated car, a transfer table, and hydraulic mechanism securing the car and table together, the hydraulic mechanism being mounted on the car and consisting of two cylinders and means for producing constant pressure in one cylinder and intermittent pressure in the other, substantially as described.

6. In a rolling mill, the combination of an elevated car, a transfer table, and hydraulic mechanism securing the car and table together, the hydraulic mechanism being mounted in a cross bar on the car, and consisting of two cylinders of different sizes and means for producing constant pressure in the smaller cylinder and intermittent pressure in the larger cylinder, substantially as described.

7. In a rolling mill, the combination of an elevated car, a transfer table, hydraulic mechanism securing the car and table together, and a walking pipe connecting the hydraulic mechanism with a source of pressure, substantially as described.

8. In a rolling mill, the combination of a transfer table, a moving guide and straightener in line with the finishing pass of the rolls, and means for raising and lowering the guide and straightener, substantially as described.

9. In a rolling mill, the combination of a transfer table, and a movable guide and straightener in line with the finishing pass of the rolls, pivoted at its outer end and adjustable vertically at its inner end, whereby it may be raised to its operative position or lowered to clear the table, substantially as described.

FRANCIS H. TREAT.

Witnesses:
EPHRAIM BANNING,
ANNIE C. COURTENAY.

Corrections in Letters Patent No. 516,460.

It is hereby certified that in Letters Patent No. 516,460, granted March 13, 1894, upon the application of Francis H. Treat, of Chicago, Illinois, for an improvement in "Transfer Tables for Rolling Mills," an error appears in the printed specification requiring the following correction, viz: On page 3, line 93, the word "moving" should read *movable;* and that the said Letters Patent should be read with this correction therein that the same may conform to the record of the case in the Patent Office.

Signed, countersigned, and sealed this 27th day of March, A. D. 1894.

[SEAL.]

JNO. M. REYNOLDS,
*Assistant Secretary of the Interior.*

Countersigned:
JOHN S. SEYMOUR,
*Commissioner of Patents.*